United States Patent
Sato et al.

[11] Patent Number: 6,103,418
[45] Date of Patent: *Aug. 15, 2000

[54] CLOSED SECONDARY BATTERY AND ITS MANUFACTURING METHOD

[75] Inventors: Kenji Sato; Hiroshi Inoue; Nobuyasu Morishita; Munehisa Ikoma, all of Toyohashi, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/938,302

[22] Filed: Sep. 26, 1997

[30] Foreign Application Priority Data

Sep. 26, 1996 [JP] Japan .................. 8-254245

[51] Int. Cl.[7] .................................. H01M 2/08
[52] U.S. Cl. .................. 429/184; 429/171; 429/174; 429/178; 429/181; 429/185
[58] Field of Search .................... 429/171, 174, 429/178, 181, 182, 184, 185

[56] References Cited

U.S. PATENT DOCUMENTS 3,986,514 10/1976 Cannon ................................. 128/419
5,462,820 10/1995 Tanaka ................................. 429/174
5,856,041 1/1999 Inoue et al. ........................... 429/182

FOREIGN PATENT DOCUMENTS

| 0 769 820 A1 | 4/1997 | European Pat. Off. |
| 89 11707 | 3/1991 | France . |
| 3520851 A1 | 12/1986 | Germany . |
| 55089840 | 6/1980 | Japan . |
| 61-51752 | 3/1986 | Japan .............................. H01M 2/08 |
| 2 133 609 | 7/1984 | United Kingdom . |

OTHER PUBLICATIONS

Copy of European Search Report dated Jan. 28, 1998 for EP 97 30 7447.

*Primary Examiner*—Maria Nuzzolillo
*Assistant Examiner*—Angela J. Martin
*Attorney, Agent, or Firm*—Ratner & Prestia

[57] ABSTRACT

A closed secondary battery having a sealing structure for preventing electrolyte leak for a long period is presented. An annular packing is chemically bonded in a ring form to the surface of a disk-shaped flange formed inside of a battery of a terminal pole projecting from inside to outside of the battery, by penetrating through a cover member of closed secondary battery. Fitting an annular spring while pulling the terminal to outside of the battery, the terminal pole is fixed in the cover member. At this time, the annular packing is compressed against the cover member, and the passage of electrolyte leak is shut by this compression.

14 Claims, 1 Drawing Sheet

CLOSED SECONDARY BATTERY AND ITS MANUFACTURING METHOD

TECHNICAL FIELD

The present invention relates to a secondary battery and more particularly to a closed secondary battery.

BACKGROUND OF THE INVENTION

The structure near the terminal pole of a conventional closed secondary battery is shown in a sectional view in FIG. 2. In FIG. 2, a terminal pole 21 is disposed by penetrating a cover 22 of a closed secondary battery 20 from inside to outside of the battery. An annular packing 25 is fitted into an annular groove 24 formed in a disk-shaped flange 23 positioned inside of the battery of the terminal pole 21. By fitting in an annular spring 27 while pulling up a pole of this terminal hole 21 to the outside of the battery, the terminal pole 21 is fixed at a specified position as shown in FIG. 2. By the pulling action when fixing the terminal pole 21, the annular packing 25 placed in the annular groove 25 of the flange 23 is compressed between the flange 23 and the inner surface of the cover 22. A sealing agent such as asphalt pitch is applied around the packing 25, which enhances the effect of preventing electrolyte leak by the addition of this sealing agent. In such constitution, the passage of the leaking electrolyte from the gap between the cover 22 and terminal pole to the outside of the battery is shut off, so that electrolyte leak from inside of the battery can be prevented.

However, when the closed secondary battery 20 is used for a long time, the sealing agent deteriorates, and the effect of preventing the electrolyte leak of the battery declines, and the electrolyte contained in the closed secondary battery may escape outside.

The invention solves the problems of the prior art, and presents a closed secondary battery enhanced in the effect of preventing electrolyte leak.

SUMMARY OF THE INVENTION

A closed secondary battery of the invention comprises a battery container, electrolyte contained in the battery container, a cover member installed at an end of the container, having a penetration hole, a terminal pole installed by penetrating through the penetration hole, and a sealing member installed between the upper surface of the flange and the inner surface of the cover member, at a position enclosing the pole. The terminal pole has a flange and a pole projecting from the flange. An upper surface of the flange confronts an inner surface of the cover member in the container, and the pole penetrates in a direction from inside to outside of the container through the penetration hole, having a gap formed between the penetration hole and the pole. The sealing member can be deformed by an external force, and a lower side of the sealing member is chemically bonded to the flange. An upper side of the sealing member is compressed by a pressing force between the upper surface of the flange and an inner surface of the cover member, to contact with the inner surface of the cover member.

A manufacturing method of a closed secondary battery of the invention which comprises a battery container, electrolyte contained in the battery container, a cover member installed at an end of the container, a terminal pole installed by penetrating through a penetration hole, and a seating member installed between an upper surface of a flange and an inner surface of the cover member is a manufacturing method comprising (a) a step of forming the terminal pole having the flange and a pole projecting from the flange, (b) a step of bonding chemically the sealing member to the upper surface of the flange, at a position enclosing the pole, (c) a step of penetrating the pole by forming a gap, in a direction from inside to outside of the container through the penetration hole, and opposing the upper surface of the flange bonding the sealing member against the inner surface of the cover member in the container, and (d) a step of fixing the terminal pole and the cover member, so that the upper surface of the sealing member may contact with the inner surface of the cover member as being compressed by a pressing force between the inner surface of the cover member and the flange. The sealing member can be deformed by an external force.

In this constitution, electrolyte leak through the gap between the terminal pole and cover member is completely prevented, and the electrolyte of the closed secondary battery can be prevented for a long period. Moreover, since the shape of the terminal pole is simple, the manufacturing cost of the terminal pole is saved. Still more, since the shape of the sealing member does not require high precision, the manufacturing cost of the sealing member is also lowered.

DESCRIPTION OF THE PREFERRED EMBODIMENT

A preferred embodiment of the invention is described below while referring to the accompanying drawing. The embodiment is only a practical example of the invention, and is not intended to limit the technical scope of the invention whatsoever.

Figure 1:
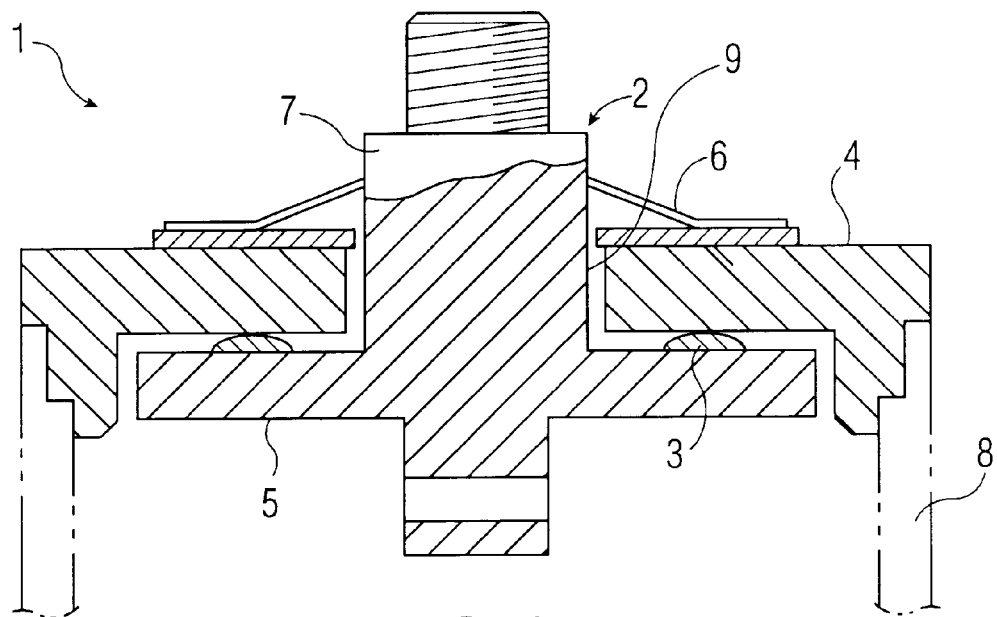
FIG. 1 is a sectional view showing a constitution near a terminal pole of a closed secondary battery according to an embodiment of the invention.

A constitution near a terminal pole of a closed secondary battery according to an embodiment of the invention is shown in FIG. 1. In FIG. 1, a closed secondary battery 1 comprises a container 8, a functional member (not shown) such as electrolyte contained in the container 8, a cover member 4 installed at an end of the container 8, and a terminal pole 2 installed by penetrating through the cover member 4. The terminal pole 2 integrally forms and comprises a pole 7 and a disk-shaped flange 5. The pole 7 penetrates through the cover member from inside of the battery, and projects outside of the battery. The projecting pole 7 is fixed to the cover member 4 by the spring pressure of an annular spring 6. A flange 5 is formed inside of the battery of the terminal pole 2. The cover member 4 is made of, for example, synthetic resin or metal material. The container 8 is made of, for example, synthetic resin or metal material. The terminal pole 2 is made of a metal material having conductivity or the like. The cover member 4 has a penetration hole in its center. The pole 7 of the terminal pole 2 penetrates through its penetration hole, and projects outside of the battery. In the penetration hole, a gap 9 is formed between the pole 7 and the cover member 4. A sealing member 3 is installed on the surface of the flange 5 in a ring form centered on the pole 7. That is, the surface of the flange 5 mounting the sealing member 3 and the inner surface of the cover member 4 are disposed oppositely to each other. The sealing member 3 is composed by using an elastic material which can be deformed as being compressed by an external pressure. The sealing member 3 is made of, for example, rubber material, elastic material, or packing material.

In the embodiment, this sealing member 3 is chemically bonded to the surface of the flange 5. More preferably, the sealing member 3 contains an element chemically adhering to the surface of the flange 5. As such sealing member 3, for example, butadiene rubber, ethylene propylene rubber or other rubber material is used. These rubber materials contain vulcanizing agent or crosslinking agent such as sulfur and peroxide in their material components, and such vulcanizing agent or crosslinking agent is chemically bonded with an oxygen atom on the surface of the flange 5 when curing the rubber materials, so that the rubber materials are firmly adhered and fixed to the surface of the flange 5.

Incidentally, as the method of chemically bonding the sealing member 3 and flange 5, there is also a method of using a junction material that can be chemically joined to both sealing member 3 and flange 5. In this method, however, the effect is slightly smaller than the above case of using a rubber material containing vulcanizing agent or crosslinking agent, but the effect is superior to that of the prior art.

An example of bonding and fixing the sealing member 3 to the flange 5 by using the rubber material such as butadiene rubber or ethylene propylene rubber is described below. First, the rubber material containing vulcanizing agent or crosslinking agent is pre-molded in a specified ring shape. In this case, the vulcanizing agent of crosslinking agent does not react, but remains in the rubber material. The pre-molded rubber material is put on the surface of the flange 5 of the terminal pole 2, and is heated while applying a light pressure. By this heating, the pre-molded rubber material is crosslinked and cured, while the sulfur or peroxide contained in the rubber material chemically react with oxygen on the surface of the flange 5 to be bonded, so that an elastic cured rubber material (that is, the sealing member 3) is formed, and is firmly bonded to the flange 5.

Meanwhile, the rubber material containing vulcanizing agent or crosslinking agent that can react with oxygen is not limited to butadiene rubber or ethylene propylene rubber, but other rubber materials including synthetic rubber and natural rubber can be used.

Other example of bonding and fixing the sealing member 3 to the flange 5 is described next. First, using a first rubber material, a ring-shaped sealing member 3 having an elasticity is prepared. Then, this ring-shaped sealing member 3 is adhered and fixed to the flange 5, by using an adhesive having a second rubber material containing a vulcanizing agent or crosslinking agent that can react with oxygen. In this case, the rubber material, vulcanizing agent, or crosslinking agent contained in the adhesive chemically reacts with the vulcanizing agent or crosslinking agent remaining in the first rubber material, or the rubber component that has not reacted yet, and is chemically joined to the sealing member 3. At the same time, the second rubber material (that is, the adhesive) is cured, and the sulfur or peroxide contained in the adhesive chemically reacts with the oxygen on the surface of the flange 5, and is joined firmly. In this way, the sealing member 3 is joined to the flange 5. This method is slightly inferior in the effect to the above method not using the adhesive, but has a better effect than the prior art.

Below is described a method of fixing the terminal pole 2 to the cover member 4. The pole 7 of the terminal pole 2 is inserted into the penetration hole in the cover member 4 from inside of the battery. Then, with the terminal pole 2 having the sealing member 3 in the state of pulling up the flange 5 to outside of the battery, the annular spring 6 is press-fitted into the pole 7 of the terminal pole 2. In this way, the terminal pole 2 is fixed at a specified position, and the sealing member 3 is pressed between the flange 5 and the inside of the cover member 4, and compressed and deformed. As a result, the gap 9 running from inside to outside of the battery is closed by the sealing member 3, thereby preventing leak of electrolyte contained in the battery.

Figure 2:
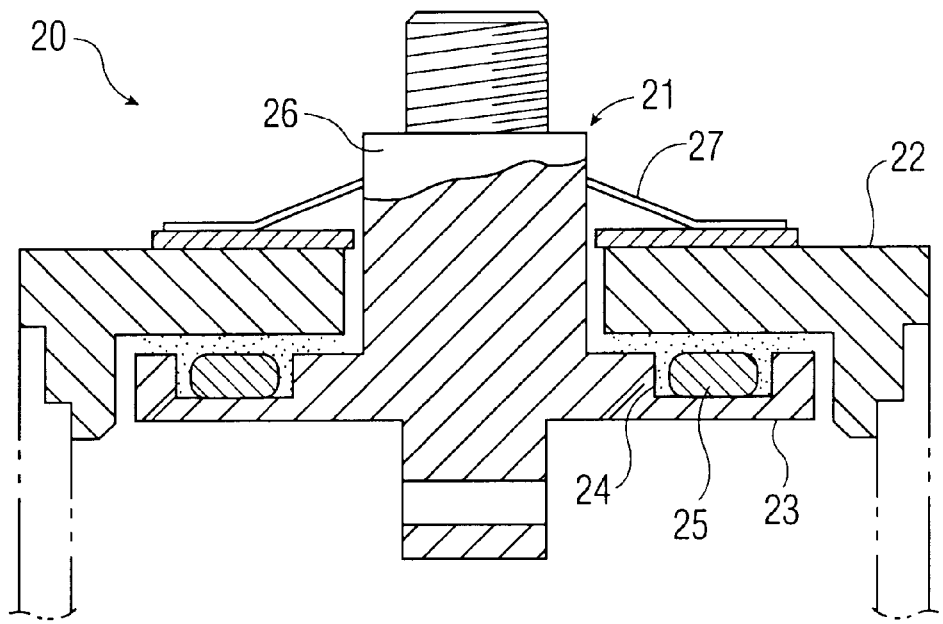
FIG. 2 is a sectional view showing a constitution near a terminal pole of a conventional closed secondary battery.

In the conventional constitution in FIG. 2, both the contact portion of the annular packing 25 and flange 23, and the contact portion of the annular packing 25 and cover 22 were possible to form a passage for electrolyte leak, but in the constitution of the invention, by contrast, since the sealing member 3 and flange 5 are completely bonded chemically, possibility of electrolyte leak is found only in the contact portion of the sealing member 3 and cover member 4. Therefore, the constitution of the embodiment is excellent in the effect of preventing electrolyte leak as compared with the prior art. Moreover, as other constitution, it is also possible to inject a sealing agent such as asphalt pitch in the contact portion of the sealing member 3 and cover member 4, and in this constitution, therefore, the electrolyte leak in the contact portion of the sealing member 3 and cover member 4 is decreased, so that the effect of preventing electrolyte leak is further enhanced.

The effects of the embodiment are specifically described below. The closed secondary battery of the embodiment, and the closed secondary battery of the conventional constitution were comparatively experimented. Samples of five cells of the closed secondary battery of the embodiment and five cells of closed secondary battery of the conventional constitution were prepared. These samples were kept in an atmosphere of 45° C. for 2 years. Then the alkaline reaction on the surface of the cover members 4, 22 was investigated to check for presence or absence of electrolyte leak. The results are shown in Table 1.

TABLE 1

|  | Sample No. | Electrolyte leak |
| --- | --- | --- |
| Closed secondary battery of the embodiment | 1 | Absent |
|  | 2 | Absent |
|  | 3 | Absent |
|  | 4 | Absent |
|  | 5 | Absent |
| Closed secondary battery of the prior art | 6 | Present |
|  | 7 | Present |
|  | 8 | Present |
|  | 9 | Present |
|  | 10 | Present |

As clear from Table 1, all samples of the closed secondary battery having the constitution of the embodiment (samples No. 1 through No. 5) were free from electrolyte leak. By contrast, electrolyte was detected in all samples of the closed secondary battery of the conventional constitution (samples No. 6 through No. 10). That is, the closed secondary battery having the constitution of the embodiment has an effect of preventing electrolyte leak for a long period. As a result, the closed secondary battery having an excellent long-term reliability is obtained.

As clear from the comparison between FIG. 1 showing the embodiment and FIG. 2 showing the prior art, the groove for disposing the sealing member 3 is not needed in the embodiment. Hence, the shape of the terminal pole 2 is simple. As a result, the manufacturing cost of the terminal pole 2 is lowered. Still more, the sealing member 3 does not require high precision in its shape. That is, the sealing member 3 is processed so that the ring-shaped sealing member 3 may be positioned on the outer circumference of the gap 9. Accordingly, the processing job of the sealing member 3 is easy, and the manufacturing costs of the sealing member is lowered. Moreover, it is possible to dispose by joining the sealing member 3 directly to the flange 5 by using a rubber material containing a crosslinking agent, and therefore it does not require sealing member 3 having a high surface precision.

In this constitution, electrolyte through the gap between the terminal pole and cover member is completely prevented, and the electrolyte of the closed secondary battery is prevented for a long period. In addition, since the shape of the terminal pole is simplified, the manufacturing cost of the terminal pole is reduced. Further, since the shape of the sealing member does not require high precision, the manufacturing cost of the sealing member can be reduced.

What is claimed is:

1. A closed secondary battery comprising:
   (a) a battery container,
   (b) a cover located at an end of said container,
   (c) a terminal pole disposed in said cover,
   said terminal pole having a flange,
   an upper surface of said flange confronting an inner surface of said cover, and
   (d) a sealing member located between said upper surface of said flange and said inner surface of said cover member,
   a part of said sealing member being chemically and directly bonded, but not by an adhesive, to said flange, and
   an upper side of said sealing member in contact with said inner surface of said cover member.

2. A closed secondary battery of claim 1, wherein said sealing member is made of a rubber material, and said rubber material is chemically bonded to said flange.

3. A closed secondary battery of claim 1, wherein said flange is of a metal material, said sealing member is of a rubber material containing a curing agent of a vulcanizing agent, a crosslinking agent or both, and said rubber member is chemically bonded to said flange by chemical reaction between said curing agent and oxygen on the surface of said metal material.

4. A closed secondary battery of claim 1, wherein said flange is of a metal material, said sealing agent is of a rubber material, and said sealing member is chemically bonded to said flange by using a rubber adhesive containing a curing agent of a vulcanizing agent, a crosslinking agent or both, whereby said curing agent chemically reacts with oxygen on the surface of said metal material so that said rubber adhesive is chemically bonded to said flange, and said curing agent chemically reacts with said rubber material so that said rubber adhesive is chemically bonded to said sealing member.

5. A manufacturing method of a battery comprising the steps of:

(a) forming a terminal pole having a flange and a pole projecting from said flange, (b) bonding chemically a sealing member to an upper surface of said flange, a part of said sealing member being chemically and directly bonded, but not by an adhesive, to said flange, and (c) fixing said terminal pole to a cover of said battery, so that an upper surface of said sealing member contacts an inner surface of said cover, said sealing member being disposed between said upper surface of said flange and said inner surface of said cover.

6. A manufacturing method of a battery of claim 5, wherein said sealing member is made of a rubber material, and said step (b) is a step of bonding said rubber material chemically to said flange.

7. A manufacturing method of a battery of claim 5, wherein said flange is of a metal material, said sealing member is of a rubber material containing a curing agent of a vulcanizing agent a crosslinking agent or both, and said step (b) is a step of said curing agent chemically reacting with oxygen on said metal material so that said rubber member is chemically bonded to said flange.

8. A manufacturing method of a battery of claim 5, wherein said flange is of a metal material, said sealing agent is of a rubber material, and said step (b) is a step of bonding said sealing member chemically to said flange, by using a rubber adhesive containing a curing agent of a vulcanizing agent, a crosslinking agent or both, whereby said curing agent chemically reacts with oxygen on said metal material so that said rubber adhesive is chemically bonded to said flange, and said curing agent chemically reacts with said rubber material so that said rubber adhesive is chemically bonded to said sealing member.

9. The closed secondary battery of claim 1, wherein said sealing member includes a bonding agent, and said bonding agent is chemically bonded to said flange.

10. The closed secondary battery of claim 1, wherein said sealing member is of a curable material, and said curable material is chemically bonded to said flange.

11. The closed secondary battery of claim 1, wherein said sealing member contains a bonding agent,
    said sealing member is bonded only at a lower side thereof to said flange, an upper side of said sealing member in contact with and without chemical bonding to said cover member.

12. The method of claim 5, wherein said sealing member includes a bonding agent, and at said (b) step, said bonding agent is chemically bonded to said flange.

13. The method of claim 5, wherein said sealing member is of a curable material, and at said (b) step said curable material is chemically bonded to said flange.

14. The method of claim 5, wherein at said (b) step, said sealing member contains a bonding agent,
    said sealing member is bonded only at a lower side thereof to said flange, an upper side of said sealing member in contact with and without chemical bonding to said cover member.

* * * * *